United States Patent

Faith et al.

[15] 3,679,876

[45] July 25, 1972

[54] CARD DECK CHECKER

[72] Inventors: Ruth L. Faith, Alexandria, Va.; William Grobman, Bowie, Md.

[73] Assignee: The Singer Company, New York, N.Y.

[22] Filed: Oct. 20, 1970

[21] Appl. No.: 82,262

[52] U.S. Cl. ................235/61.7 R, 235/61.11 D, 340/149 R

[51] Int. Cl. ..........................................G06k 1/12, G06k 5/00

[58] Field of Search ...........................340/146.2, 146.1, 149; 235/61.7, 61.11, 61.115, 61.12, 61.114

[56] References Cited

UNITED STATES PATENTS 3,102,191 8/1963 Chiapuzio, Jr. et al. ..............235/61.7

3,034,643 5/1962 Keller et al. ........................235/61.12

*Primary Examiner*—Thomas A. Robinson

*Attorney*—Francis L. Masselle and William Grobman

[57] ABSTRACT

This invention provides a means for determining if the individual punched cards in a deck of punched cards are in proper sequence, if the deck is complete, and if the deck contains strange and unrelated cards. Once a deck of cards has been arranged in its proper sequence, the edge of the deck is painted with a stripe of magnetic material, and information representing the order of the cards in the deck is recorded thereon. At a subsequent time, and before the deck is read into a computer, the magnetic information on the edge of the deck is read to check the order and completeness of the deck of cards. Information may be recorded on the magnetic stripe in the form of pulse patterns, or in the form of positional information. The recorder is a simple device using a standard multichannel magnetic pulse recording head and provides the means for moving the deck of cards past the head. The reading device is similar to the recording device.

8 Claims, 7 Drawing Figures

INVENTORS
RUTH L. FAITH
WILLIAM GROBMAN
BY
William Grobman

INVENTORS
RUTH L. FAITH
WILLIAM GROBMAN
BY

CARD DECK CHECKER

This invention relates to digital data equipment and more particularly to devices for determining when the record receivers in a group of record receivers are all properly related.

One of the major means for introducing information into a computer is the punched card. Each punched card contains a limited amount of information, and a large number of punched cards is required even for a moderate size computer program. It is important that a deck of cards which contains a computer program or other information and data be complete and arranged in its proper order before the program is inserted into the computer. Any card deck is subject to being dropped or shuffled or to other irregularities, so that when the cards are read into the computer, the results may be less than satisfactory. Deviations in sequence, or missing or strange cards, must be identified and corrective action taken. Unfortunately, deviations from the prepared sequence or the absence of necessary cards are not usually discovered until attempts have been made to operate the computer. Then, the loss or the variations are determined and corrected. In the meantime, however, considerable computer time has been wasted, and since normally, computer time is subject to scheduling as well as expensive, it is desirable to keep input errors to a minimum. This invention provides a means for checking the validity of a deck of cards before it is read into the computer.

It is an object of this invention to provide a new and improved digital data input handling device.

It is another object of this invention to provide a new and improved system for determining improper arrangements of individual data records.

It is a further object of this invention to provide a new and improved system for checking the arrangement of a deck of punched cards.

It is still another object of this invention to provide a new and improved system for checking the arrangement of a deck of punched cards without utilizing digital computer central processing.

Other objects and advantages of this invention will become apparent as the following description proceeds, which description should be considered together with the accompanying drawings in which.

Figure 1:
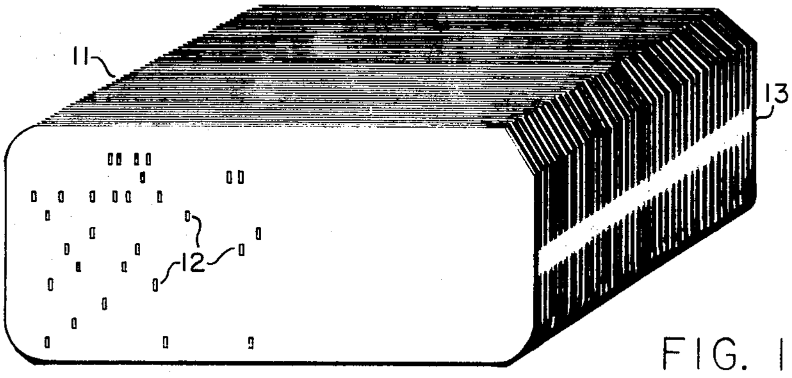
FIG. 1 is a perspective view of a deck of punched cards.

Referring now to the drawings in detail and in particular to FIG. 1, the reference character 11 designates a deck of punched cards. The face of only the front card is shown, and that card, as all punched cards, contains a plurality of perforations 12, which represents information. The deck of cards 11 has along one edge of the deck a stripe 13 formed of magnetic material such as a magnetic ink, paint, or the like. Although not visible, the magnetic stripe 13 contains information recorded thereon in the form of magnetic pulses. The pulses are recorded on the stripe 13 so that each card of the deck 11 has a separate pulse combination recorded on its edge, and the combinations form an overall pattern. In this manner, each card has recorded on it a pulse combination which has a prescribed position in the overall pattern of pulses. The simplest such code combination is a standard binary count, where each card has recorded on its edge a combination of pulses which represents the next higher number than the preceding card and the next lower number than the succeeding card. Since there about 140 punched cards to the deck inch, this invention contemplates recording magnetic pulses with a density of about 140 to the inch. Present-day computer magnetic tape units normally record and read pulses which are packed on tapes in densities which range from 200 pulses per inch to 800 pulses per inch, with 556 pulses per inch being a very popular density. Before the deck of cards 11 is used as computer input, its magnetic stripe is read to determine whether or not cards are missing or are displaced from their proper location. By providing the magnetic stripe 13 with a standard pattern or pulse combination, the pulse combinations can be read, and any missing combination can be readily noted. Should this happen, the location of the missing or misplaced card is indicated, and the programmer who wishes to use the deck 11 knows that the deck is either incomplete or in improper order.

Figure 2:
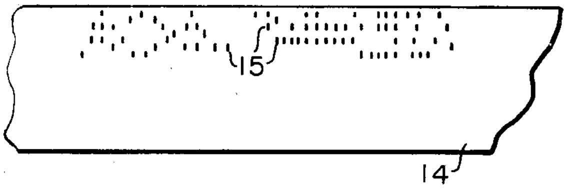
FIG. 2 is an illustration of a portion of magnetic tape.

A short piece of magnetic tape 14 is shown in FIG. 2. Normally, magnetic pulses on such tape are invisible, but for this discussion several such pulses 15 have been shown in different combinations. A typical magnetic tape used for digital computer pulses is one-half inch in width and has room across the width for eight separate channels, each of which may have pulses recorded therein. Eight channels of pulses provide 256 combinations, and if a standard eight-channel magnetic tape recording head is used to read and write information, the pattern would be recurrent after 256 pulse combinations. The stripe 13 along the edge of the deck of cards 11 is, at this time, contemplated to be very similar to the strip of magnetic tape 14 placed on the edge of the deck of cards 11. With a pulse density of 140 pulses to the inch, the deck of cards 11 can have information recorded upon it so that a different combination is recorded on the edge of each of the individual cards.

Figure 3:
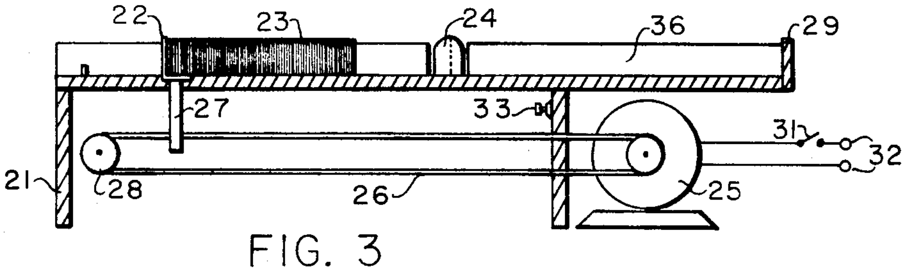
FIG. 3 is a side view, partially in section, of an apparatus for reading magnetic information written on the edge of the deck of cards.

One apparatus for reading the pulse information from the edge of the cards 23 is shown in FIG. 3, where a table 21 carries an L-shaped member 22 in a slot therein. A tongue 27 is fastened to the member 22 and passes through the slot of the table 21. A belt 26 has its two ends attached to the two sides of the tongue 27 and passes over a pulley on a motor 25 and over an idler pulley 28. Abutting one side of the L-shaped member 22 and resting upon the other side of the member 22 is a deck of cards 11. Mounted on the table 21 approximately in the center thereof is a standard magnetic read-write head 24. At the foot of the table 21 is a lip or stop 29. The motor 25 is connected through a switch 31 to a pair of input terminals 32 which may be connected to a source of energy.

The device of FIG. 3 is arranged to read the magnetic pulse combination encoded in the magnetic stripe 13 on the edge of the cards 23. The deck of cards 11 is placed on the table 21 so that one end thereof abuts one side of the member 22. Not shown, is a spring biased plate which rests against one edge of the deck 11 to press it against the head 24. The switch 31 is closed, energizing the motor 25 which rotates, pulling the belt 26 over the idler 28. As the motor 25 turns, the tongue 27 is moved to the right, pulling with it the L-shaped member 22 and the deck of cards 11. The cards of the deck 11 are moved past the reading head 24 where the magnetic pulse combinations impressed on the deck 11 are read. This operation continues until the tongue 27 strikes the limit switch 33, deenergizing motor 25, and the entire apparatus comes to a stop. The cards 23 are removed, the L-shaped member 22 is manually moved to the left, and the apparatus is ready for the next deck of cards.

Figure 4:
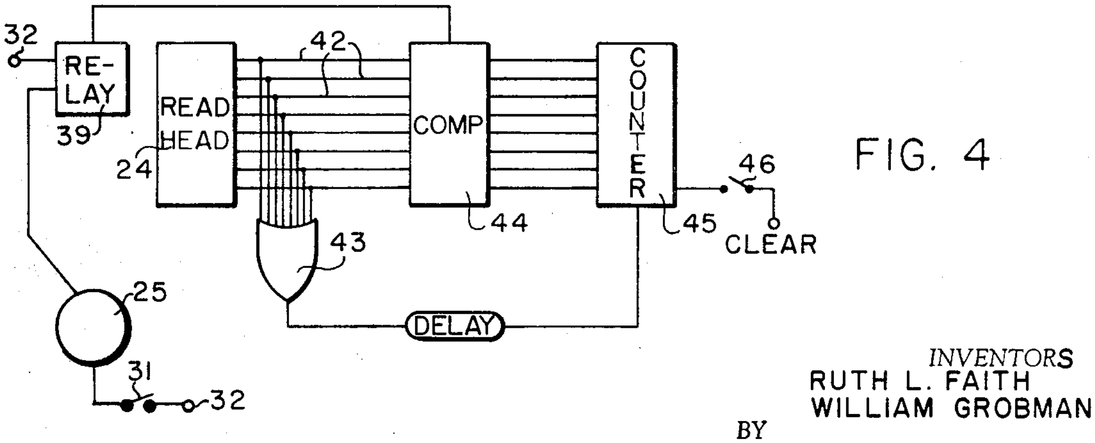
FIG. 4 is a block diagram of the electrical system for indicating whether the specially marked deck of cards is in its proper order.

The electrical apparatus for reading the information contained on the edge of the deck 11 of cards 23 is shown in FIG. 4, wherein the read-head is designated 24. Emanating from the head 24 is a plurality of lines 42 which is connected to one input of a comparator 44. A counter 45 also has a plurality of lines connecting its output to the other input of the comparator 44. In addition, all of the lines 42 are connected to the inputs of an OR-gate 43, whose output is applied to the stepping input of the counter 45. A switch 46 is connected to the counter 45 and can be used to reset the counter 45 to zero. The comparator 44 has an output which is connected to a relay 39 which is interposed between one of the terminals 32 and the motor 25.

When the motor 25 is energized, as described above in FIG. 3, the cards 23 are moved past the reading head 24. An electrical signal is generated in the reading head 24 for each magnetic pulse that passes the head 24. As indicated above a standard eight-channel magnetic head can be used, and this type of head simultaneously reads 8 channels of magnetic information. Assuming that such a reading head 24 is used, eight output lines 42 are shown connecting the output from the reading head 24 to one side of an 8-section comparator 44. Since the comparator 44 can be any suitable digital comparator, no details of its construction are given herein, but, for example, such a comparator can comprise eight half-adders, each of which has two input signals applied thereto. One input signal would come from the counter 45 and the other input signal would come from the reading head 24. So long as both input signals were the same (either 00 or 11) no output would pass the half-adder, but should the two inputs be different (either 10 or 01) then the half-adder would generate an output signal. The outputs from the half-adders would be applied to an OR gate, the output of which would constitute the comparator output. Thus, when the information being read from the deck of cards 11 by the reading head 24 and that generated by the counter 45 is different, the comparator 44 generates an output signal which operates relay 39 to interrupt the operation of the motor 25. This stops further movement of the cards 23 and indicates to the operator that there is something wrong with his deck of cards. If desired, the relay 39 could also be used to energize a signal such as a bell or a light whenever it interrupts the operation of the motor 25.

The system of FIG. 4 contemplates recording on the edge of the cards 23 an eight-place binary number whose value from card to card is increased by one. The lines 42 also feed to the input of the OR-gate 43, so that each time an output signal is generated by the head 24, it is applied to the input of the counter 45 through the gate 43 to step the counter 45 to the higher value. If the first card 23 in the deck 11 has a number equal to one recorded upon it, and the counter 45 has been cleared to one by closing the switch 46, then there will be a direct comparison made by the comparator 44, and no output signal will be generated by the comparator. The passage of the output pulse from the head 24 through the OR-gate 43 causes the counter 45 to step to a count of two so that when the second card 23 (which should have recorded on its edge an eight-digit number having a value of two) passes the head 24, the comparator 44 again sees a direct comparison between the output of the head 24 and that of the counter 45. Should one of the cards 23 in the deck 11 be missing or out of place, the comparator 44 will not see two equal inputs and will generate an output signal to operate the relay 39 and halt further reading of the cards 23. Since the reading of the cards 23 can be done quite quickly, the operator knows before he applies the deck of cards to the computer that his deck is in order and is complete. Should the deck be rejected as incomplete or having cards out of order, then the operator can physically review that portion of the deck which is adjacent the reading head 24 to determine what is the problem.

Figure 5:
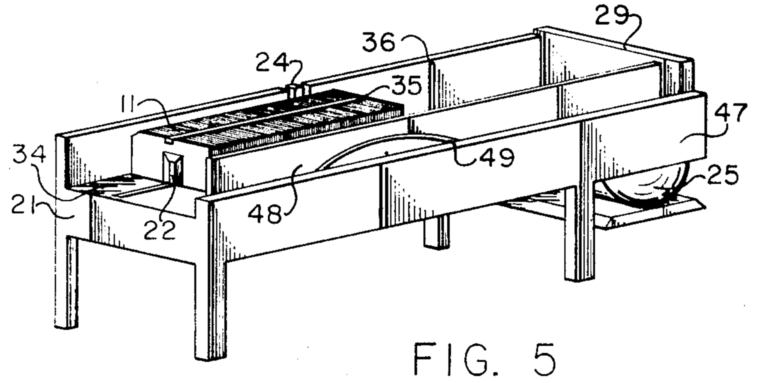
FIG. 5 is a perspective view of the reader of FIG. 3.

Some of the details of the construction of the device of FIG. 3 are shown more clearly in FIG. 5. One side 47 of the table 21 is extended above the top 34 of the table. As shown and described above, the reading head 24 is mounted on the top of the table adjacent the side opposite the side 47. The deck of cards 11 is placed between the two. A bow spring 49 is fastened to a moveable elongated member 48. The bow spring 49 is compressed and the member 48 is moved adjacent to the side 47 when the deck of cards 11 is placed on the table 21. When the member 48 is released, the bow spring 49 pushes the member 48 against the side of the cards 23 so that they are firmly pressed against the head 24 and the guides 36. To keep the cards 23 tightly together the spring clip 35 or other similar device can be used on the deck 11.

Figure 6:
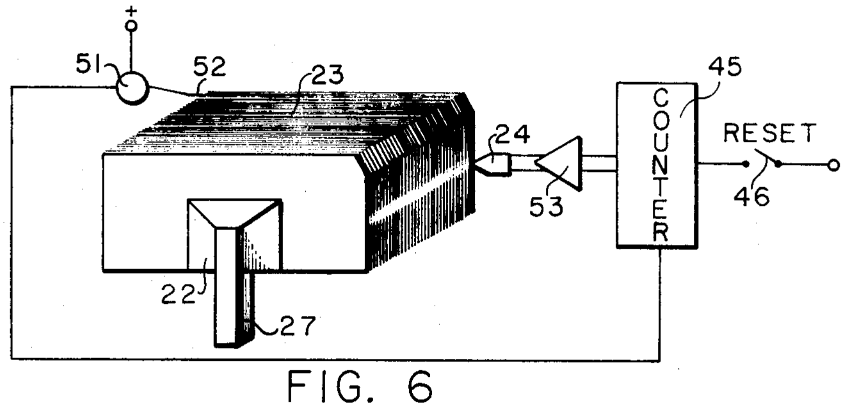
FIG. 6 is a block diagram of a system for recording direct information on the edges of a deck of cards.

A system for recording information on the cards 23 is shown in FIG. 6. The cards 23 are shown adjacent a recording head 24. The input to the head 24 comes from a counter 45 and is applied through an amplifier 53. The counter 45 has a reset switch 46 connected to its reset input. Adjacent the cards 23 is a feeler 52 which is mechanically attached to a switch means 51. Switch means 51 is connected to the stepping input of the counter 55. In order to record information on the edge of the cards 23, the deck of cards is placed on the table 21 or similar device, in the holder 22 and may be moved past the head 24 by any suitable mechanism such as that shown in FIG. 3. The output of the counter 45 is amplified by the amplifier 53 and is applied to the record head 24 to record the counts of the counter 45. Initially, switch 46 is closed to reset the counter 45 to a count of one. This information is recorded on the edge of the first card 23 as that card is moved past the head 24. As each card 23 moves past the head 24 it moves the feeler 52. This movement of the feeler 52 causes the switch 51 to generate a pulse which is applied to the counter 45 to step it to the next higher count. Thus, as each card moves past the head 24, its movement causes the stepping of the counter 45 to the next higher number, and that number is recorded on the next adjacent card 23. The apparatus shown in FIG. 6 can be used with the table shown in FIGS. 3 and 5 to record that information on the edge of the deck of cards 11 which is read by the apparatus shown in FIG. 4. Although not shown in this manner, the apparatus of FIGS. 4 and 6 could be readily mounted on the table 21 to form a single read-write unit.

Figure 7:
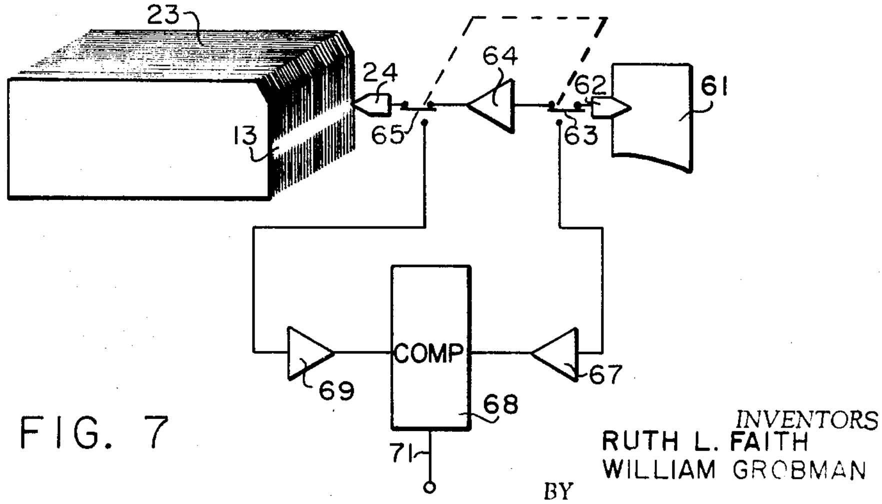
FIG. 7 is a side view of an apparatus for reading and writing magnetic information on the edge of a deck of cards.

The apparatus shown in FIGS. 4 and 6 is one type of apparatus for recording one type of pattern upon the edges of the cards 23 and for reading that pattern. Any suitable recurring pattern could be used as well, and FIG. 7 is a block diagram of one such apparatus. Cards 23 are shown adjacent a read-write head 24, which has its input connected to the moveable contact of a switch 65. One stationary contact of the switch 65 is connected to the output of the amplifier 64, whose input is connected to one stationary contact of a switch 63. The movable contact of the switch 63 is connected to the output of a reading head 62, which reads information recorded upon a tape 61, or other similar record device. The other stationary contact of the switch 63 is connected to the input of an amplifier 67, whose output provides one input to a comparator 68. The other stationary contact of the switch 65 is connected to the input of an amplifier 69, the output of which supplies the other input to the comparator 68. The two switches 63 and 65 are mechanically ganged to move together.

The apparatus of FIG. 7 serves for both recording information in a recurrent pattern upon the edges of the cards 23 and for reading that information and comparing it with the original pattern. With the switches 63 and 65 in the position shown, the apparatus of FIG. 7 records information on the cards 23. The entire apparatus can be considered as being mounted on a table similar to the table 21 shown in the FIGS. 3 and 5, so that the cards 23 may be driven by any suitable apparatus such as that shown in those figures. It is contemplated that the record member 61 is driven by the same motor, in this case the motor 25, that drives the cards 23 past the head 24. In this manner, this movement of both recording media are synchronized. The record member 61 is set to its initial starting point. No means for initially setting the member 61 is shown since this means will vary from record to record. For example, if the record 61 is a disk, one type of indexing means may be used, whereas another type may be used if the record 61 is magnetic or punched tape. In addition to these records, photograph transparencies, photograph type disks, and the like may also be used for the record 61. The record 61 has recorded upon it a recorded pattern of digital information. If it is assumed that multichannel reading and writing heads 24 and 62 are used, it can be assumed that the recorded pattern can be in the form of a multidigit binary number, but, actually, any suitable pattern can be used. When the motor 25 is energized, the cards 23 are moved past the recording head 24 and the record 61 is moved in synchronism past the reading head 62. The information recorded on the record 61 is read by the head 62, is amplified by the amplifier 64, and is applied to the recording head 24. The recording head 24 applies that information to the magnetic stripe 13 along the deck. Should the record 61 by shorter than the deck of cards, the pattern will be repeated until the entire deck of cards is recorded upon. When the information on the deck of cards is to be read, the two switches 63 and 65 are moved to their other positions. This connects the reading head 62 through an amplifier 67 to the one input of the comparator 68, and it connects the head 24 through an amplifier 69 to the other input of the comparator 68. Again, the record 61 is placed in its starting position, and the deck of cards is placed in position to be read. When the motor 25 is energized, it drives the cards 23 and the record 61 together and at the same speed. The information recorded on the edge of the cards 23 and the information recorded on the record 61 are read simultaneously and are applied to the two inputs of the comparator 68. So long as the two records agree, the comparator 68 does not generate an output on the line 71, but when there is a disagreement between the two records, the comparator 68 generates a signal which is applied to the output line 71. The output of the comparator 68 may be connected just the same as the output of the comparator 44, shown in FIG. 4, to deenergize the motor 25 and otherwise signal a discrepancy. As mentioned above, the output from the comparator 68 may be used in any other way desired.

The above specification has described apparatus for recording information on the edge of a deck of punched cards. The apparatus described above reads the information recorded on the edge of the cards to determine whether or not the cards in the deck are in the proper order and whether or not the deck is complete before the deck is applied to the computer and valuable computer time is wasted. However, other uses and other apparatus may be used with the cards of this invention. For example, once a deck of cards is assembled, information representing the title of the deck of cards, or an identification number, can be recorded on the stripe of magnetic ink applied to the edge of the deck. Of course, this information could be in lieu of the sequential information described above. When a large number of such decks are arranged in a library of programs and other information, the particular deck of cards desired can be recovered quickly and automatically by feeding the identifying information into one side of a comparator, such as the comparator 44 or 68, and feeding the information read from the decks of cards into the other side of the comparator. In this case, when the two inputs of the comparator match, the comparator generates an output signal which can be used to operate an arm or other similar device to pluck the identified deck from among its neighbors. If desired, two magnetic stripes 13 can be applied to a single deck of cards. One could be applied to one edge and another stripe to another edge, or all four edges could contain one or more magnetic stripe. By using equipment similar to that described in detail above, several different types of information can be applied to the outside of a deck of cards, and this information can be used for many purposes. It is realized that the above specification may indicate to others skilled in the art additional ways in which the apparatus described above may be utilized without departing from the invention. It is, therefore, intended that this invention be limited only by the scope of the appended claims.

What is claimed is:

1. Apparatus for indicating that a group of record receivers is complete and in a proper prescribed order, said apparatus comprising a plurality of record receivers having information recorded thereon, said plurality being arranged in a prescribed order to form a single file, first means applied along one exposed edge of said file for receiving information indicating the order in which the individual record receivers are arranged in said file, second means for reading the information recorded on said first means, and third means responsive to the information read from said first means for indicating when said record receivers are not in the prescribed order.

2. The apparatus defined in claim 1 wherein said second means comprises a standard source of sequential information which corresponds to the arrangement of the information recorded on said first means, fourth means for reading said standard source, comparison means, fifth means for applying the output from said second means to an input to said comparison means, and sixth means for applying the output from said fourth means to said comparison means so that said comparison means compares said two inputs for correspondence.

3. The apparatus defined in claim 2 wherein said information recorded on said first means comprises a numerical sequence, and wherein said standard source comprises a counter, and seventh means for stepping said counter each time an item of digital information is read from said first means.

4. The apparatus defined in claim 2 wherein the information recorded on said first means is a recurrent pattern of information, and wherein said standard source comprises a record containing said recurrent pattern of information, and seventh means for synchronizing the reading of the information from said first means and from said standard source.

5. Apparatus for checking the order of documents contained in a file of many documents, said apparatus comprising a coating of magnetizable material applied along at least one exposed edge of said file, first means for recording on said magnetizable material sequential information in the form of magnetic pulses so arranged that the edge of each of said documents contains a different item of magnetic information, a standard source of said sequential information, a second means for reading the magnetically recorded information from the edge of said file, a comparison means, and third means for applying the information read from the edge of said file and information from said standard source to said comparison means simultaneously and in sequence so that said comparison means indicates when said two inputs do not coincide.

6. The apparatus defined in claim 5 wherein said sequential information comprises a series of numbers in sequence.

7. The apparatus defined in claim 6 wherein said standard source comprises a counter, and fourth means for stepping said counter each time a new item of information is read from the edge of said file.

8. The apparatus defined in claim 5 wherein said standard source comprises a separate record containing information arranged in the same order as the information recorded on the edge of said file, and fourth means for synchronizing the reading of the information from the edge of said file and from said separate record.

* * * * *